J. L. WEBB.
BICYCLE PROP AND LOCK.
APPLICATION FILED APR. 6, 1912.
1,055,581.
Patented Mar. 11, 1913.
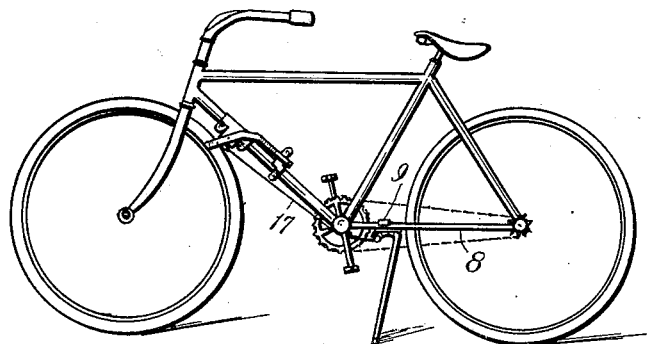
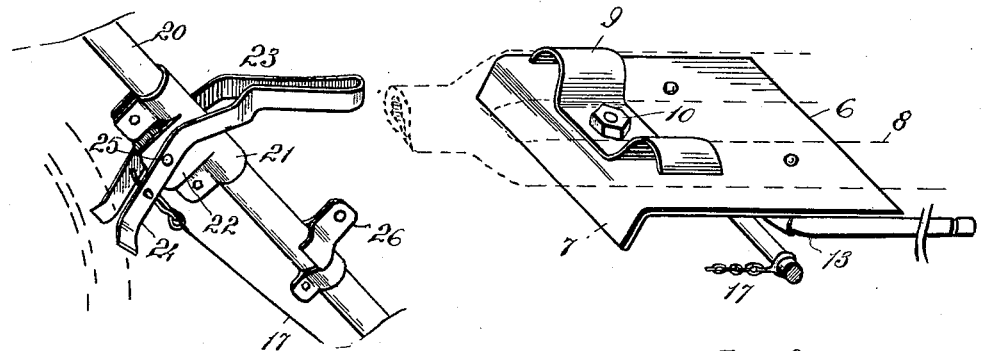
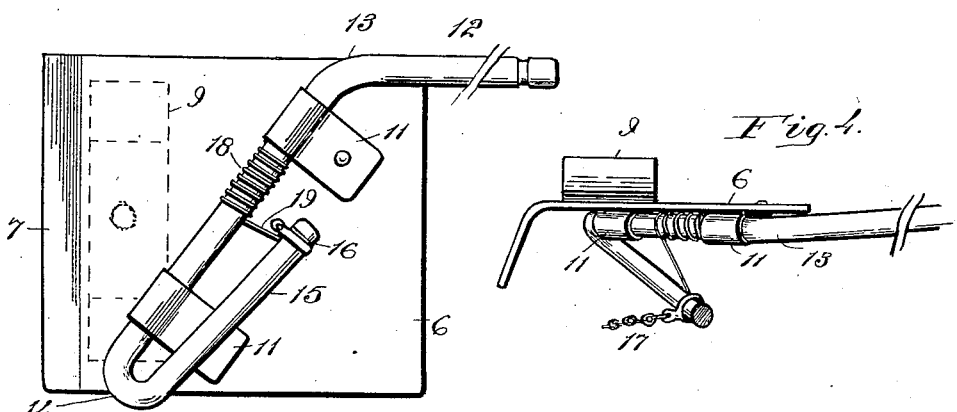
Witnesses
Charles D. Hall.
J. L. Plummer
Inventor
John L. Webb
By ........
Atty.

UNITED STATES PATENT OFFICE.

JOHN L. WEBB, OF LOS ANGELES, CALIFORNIA, ASSIGNOR OF ONE-HALF TO SAMUEL H. STIEFEL, OF LOS ANGELES, CALIFORNIA.

BICYCLE PROP AND LOCK.

1,055,581.      Specification of Letters Patent.      Patented Mar. 11, 1913.

Application filed April 6, 1912. Serial No. 688,889.

*To all whom it may concern:*

Be it known that I, JOHN L. WEBB, a citizen of the United States, and resident of Los Angeles, in the county of Los Angeles and State of California, have invented certain new and useful Improvements in Bicycle Props and Locks, of which the following is a specification.

My invention pertains to bicycles, and it has special reference to a combined prop and lock so constructed and arranged that it may be readily applied to any wheel.

The object is to provide a prop and lock which is available for application to any type of bicycle or motor-cycle, and it comprises a base plate which is attached to the frame forward of the rear wheel, this plate having on its under side a leg hinged thereto on an angle so that when the leg is swung on its pivot it will project downwardly and outwardly at such an angle as to serve as a prop for the bicycle. The lever which operates the prop is located on the frame above the front wheel, and integral with the lever is a fork which engages with the front wheel when the prop is thrown into operative position so that the front wheel is thereby prevented from turning, as will now be set forth in detail.

In the accompanying drawing, Figure 1 is a side elevation of a wheel equipped with my improved prop and lock. Fig. 2 is a perspective view of the base plate to which the prop is hinged. Fig. 3 is a perspective view of the frame rib showing the construction of the operating lever and wheel locking fork. Fig. 4 is a side view of the base plate to which the prop is hinged, and Fig. 5 is a view of the underside of the plate.

In constructing my invention I provide a plate 6 preferably square, the forward edge of which is turned down, as shown at 7. This plate is designed to be secured to the rear wheel fork 8 at or near the crotch, by means of a clip 9 which embraces both members of the fork 8, and is secured in position by the bolt 10. On the under side of this plate I secure a pair of bearing plates 11, 11, which are disposed at an angle of approximately forty-five degrees, these bearing plates being designed to receive and pivotally hold a leg 12. The leg is bent, as at 13, when it projects beyond the plate, this bend being about forty-five degrees, so that when the leg is at rest it lies along one of the members of the fork 8, but when turned down to form a prop it projects out at a suitable angle, to hold the bicycle in a slightly tilting position. It will be noted that the inner end of the leg 12 has a return bend, as at 14, to provide a link 15, by which the leg is swung into position to serve as a prop. The end of this link 15, has an annular groove 16, by means of which the operating chain 17 or cable may be attached thereto. A coil spring 18 around the pivotal portion of the leg, with one end 19 thereof resting against the limb 15, serves to swing the leg up to its position of rest when tension on the cable 17 is withdrawn.

The frame 20, directly above the front wheel has a clip 21 secured thereto in any suitable manner, this clip having on each side a downwardly projecting wing 22. Over this clip is a fork 23, the looped end of this fork being above the clip and projecting rearwardly therefrom, while the limbs 24 of the fork are astride of the clip, and hinged thereto as at 25, so that these limbs when in operative position embrace the tire of the wheel, and thus prevent it from turning. The looped end of the fork is designed to engage with a locking plate 26, secured to the upper side of the frame 20, so that when the lever 23 is swung down the shackle of a padlock may be used to secure and lock the lever to the locking plate. The cable 17, heretofore referred to, connects the limb 15 of the prop with the lower ends of the limbs 24, as shown in Fig. 3.

It will thus be seen that it is an exceedingly simple and easy matter to apply this invention to any type or size or make of wheel, as the leg can be cut off to suit the height of the wheel, and provide for the proper tilting angle, and the plate 6, as well as the clip 21 can be adjusted at any desired point on the frame, and when such adjustment is made the cable 17 can be cut the proper length to bring the prop and the locking mechanism in proper relations to each other.

What I claim as new, is:

1. In a bicycle, a fork hinged to the frame over the front wheel, the limbs of said fork adapted to engage with and embrace the wheel, the upper end of said fork being looped, and a locking plate on the frame adapted to engage with the looped fork to provide means for locking said fork to the plate.

2. In a bicycle, a frame, a plate secured to the rear end of the frame, a leg with a bend at its hinged end, hinged diagonally across and to said plate, a reverse bend on said prop parallel with the bent end thereof, a forked lever at the forward end of the frame adapted to engage with the front wheel, a connecting link between said forked lever and leg, whereby the fork of said lever will lock the front wheel when the prop is swung into operative position, and a spring attached to the reverse bend of the leg, whereby said leg is swung upwardly when the locking fork is disengaged from the front wheel.

Signed at the city of Los Angeles county of Los Angeles State of California this 4th day of January 1912, in the presence of witnesses.

JOHN L. WEBB.

Witnesses:
G. F. CRANER,
J. S. ZERBE.

Copies of this patent may be obtained for five cents each, by addressing the "Commissioner of Patents, Washington, D. C."